United States Patent
Ueda et al.

(10) Patent No.: US 10,252,866 B2
(45) Date of Patent: Apr. 9, 2019

(54) CONVEYOR SYSTEM

(71) Applicant: Daifuku Co., Ltd., Osaka-shi, Osaka (JP)

(72) Inventors: Yuichi Ueda, Shiga (JP); Noriyuki Wada, Shiga (JP); Masashige Iwata, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 16/115,921

(22) Filed: Aug. 29, 2018

(65) Prior Publication Data

US 2019/0071258 A1 Mar. 7, 2019

(30) Foreign Application Priority Data

Sep. 7, 2017 (JP) ................................. 2017-171643

(51) Int. Cl.
*B65G 17/20* (2006.01)
*B65G 47/61* (2006.01)

(52) U.S. Cl.
CPC ............. *B65G 47/61* (2013.01); *B65G 17/20* (2013.01)

(58) Field of Classification Search
CPC ........ B65G 47/61; B65G 47/62; B65G 17/20; B65G 47/38; B65G 47/40
USPC ... 198/465.4, 485.1, 476.1, 477.1, 701, 703, 198/706
See application file for complete search history.

(56) References Cited

U.S. PATENT DOCUMENTS

| | | | |
|---|---|---|---|
| 10,005,616 B2 * | 6/2018 | Fenile | B65G 17/20 |
| 2012/0037272 A1 * | 2/2012 | Wend | B65G 19/025 |
| | | | 141/250 |
| 2012/0216917 A1 * | 8/2012 | Janzen | B65G 19/025 |
| | | | 141/166 |
| 2014/0284180 A1 * | 9/2014 | Wend | B65G 17/12 |
| | | | 198/713 |
| 2014/0291123 A1 * | 10/2014 | Olivieri | D06F 67/04 |
| | | | 198/617 |
| 2016/0159558 A1 | 6/2016 | Schneuing | |

(Continued)

FOREIGN PATENT DOCUMENTS

| | | | |
|---|---|---|---|
| DE | 102004018569 A1 * | 11/2005 | ........... B65G 19/025 |
| DE | 102012018925 A1 | 3/2014 | |
| EP | 3360827 A1 | 8/2018 | |

(Continued)

OTHER PUBLICATIONS

Extended European Search Report issued in connection with EP 18190919.3, dated Jan. 25, 2019.

*Primary Examiner* — Mark A Deuble
(74) *Attorney, Agent, or Firm* — Kusner & Jaffe (57) ABSTRACT

A conveyor system for conveying an article that is stored while being suspended from a rail, the conveyor system including a bag having a body and a suspending member that suspends the body, and reorienting devices that reorient the bag. The bag has an opening on the body such that the article is dropped into and discharged from the opening. The reorienting devices include engaging members that are engaged with the body. The engaging members are engaged with the interior of the body so as to reorient the body from at least one of an orientation for conveying the article to an orientation for dropping the article into the opening or from the orientation for conveying the article to an orientation for discharging the article from the opening.

10 Claims, 11 Drawing Sheets

(56) References Cited

U.S. PATENT DOCUMENTS

2017/0369248 A1* 12/2017 Fenile .................... B65G 17/20
2018/0229944 A1    8/2018 Janzen

FOREIGN PATENT DOCUMENTS

JP      2005-075361 A      3/2005
JP       2009035310 A  *   2/2009   ............. B65G 65/30

* cited by examiner

CONVEYOR SYSTEM

FIELD OF THE INVENTION

The present invention relates to a conveyor system that conveys an article stored while being suspended from a rail.

BACKGROUND OF THE INVENTION

In the related art, conveyor systems for conveying articles such as small goods include a conveyor system for conveying articles by means of a conveyor installed on a floor, e.g., a roller conveyor or a belt conveyor and a conveyor system for conveying articles with suspending devices such as hanger sorters.

In a conveyor system including a suspending device, an article is stored in a suspended storage that is suspended from the rail of a suspending device. The suspended storage with the stored article is conveyed while being suspended from the rail.

The specification of U.S. Patent Application Publication 2016/0159558 describes a conveyor system including suspending devices according to the related art. The conveyor system conveys articles stored in suspended storages, each including a pocket main unit (storage body) that stores an article, a frame that suspends the pocket main unit, and a hook-shaped suspended element that is suspended from the suspending device and fixes the frame. In the conveyor system including the suspended storage described in the specification of U.S. Patent Application Publication 2016/0159558, the pocket main unit of the suspended storage is made up of a rear wall part, a front wall part, and a base part connecting the rear wall part and the front wall part. The front wall part has an opening for discharging an article stored in the pocket main unit. The inclination of the frame is changed relative to the suspended element, so that the relative positions of the rear wall part and the front wall part are vertically changed and the article in the pocket main unit is discharged from the opening.

In the suspended storage described in the specification of U.S. Patent Application Publication 2016/0159558, however, the parts (the rear wall part, the front wall part, and the base part) constituting the pocket main unit (storage body) are different members (parts), and the base part pivots to discharge the article, which is stored in the pocket main unit (storage body), from the opening. Thus, the configuration of the pocket main unit (storage body) may be disadvantageously complicated. For this reason, in a conveyor system according to the related art, when an article is to be conveyed while being stored in a suspended storage, a storage body having a complicated configuration such as the one described in the specification of U.S. Patent Application Publication 2016/0159558 must be used.

An object of the present invention is to provide a conveyor system where a suspended storage is usable with a storage body storing an article with a simple configuration.

SUMMARY OF THE INVENTION

A solution to the technical problem of the present invention will be discussed below.

A conveyor system according to the present invention is a conveyor system for conveying an article that is stored while being suspended from a rail, the conveyor system including: a suspended storage having a storage body for storing the article and a suspending member that suspends the storage body from the rail; and a reorienting device that reorients the suspended storage, in which the suspended storage has an opening on the storage body such that the article is dropped into and discharged from the opening, the reorienting device includes an engaging member that is engaged with the storage body, and the engaging member is engaged with the interior of the storage body so as to reorient the suspended storage from at least one of an orientation for conveying the article to an orientation for dropping the article into the opening or from the orientation for conveying the article to an orientation for discharging the article from the opening.

With this configuration, the engaging member of the reorienting device is engaged with the interior of the storage body, so that the storage body is lifted by the engaging member or is suspended by its own weight. In other words, the engaging member is engaged with the interior of the storage body so as to change the state of the storage body with respect to the suspending member and the suspended storage is reoriented. If the storage body is composed of a belt-like member (fabric band), the engaging member is engaged with the belt-like member, so that the belt-like member suspended from the suspending member is lifted by the engaging member or the belt-like member lifted with respect to the suspending member is suspended by its own weight. In other words, the engaging member is engaged with the belt-like member, so that the state of the belt-like member changes with respect to the suspending member and the storage body composed of the belt-like member is reoriented.

According to a conveyor system of the present invention, in the conveyor system, the storage body includes a loop-shaped bag having an internal storage space for the article, and the reorienting device reorients the storage body by engaging the engaging member from an opening laterally formed on the loop-shaped bag.

With this configuration, the reorienting device reorients the storage body by engaging the engaging member from the opening laterally formed on the storage body configured by the loop-shaped bag. If the storage body is composed of a belt-like member (fabric band), the loop-shaped bag is formed by connecting both ends of the belt-like member into a loop shape in the longitudinal direction. If the storage body is composed of the belt-like member (fabric band), an article storage space is formed in a space (clearance) formed between the opposed internal surfaces of the belt-like member when the belt-like member is formed in a loop shape. If the storage body is composed of the belt-like member (fabric band), an opening is laterally formed in the storage space of the bag composed of the loop-shaped belt-like member.

According to a conveyor system of the present invention, in the conveyor system, the reorienting device reorients the storage body by engaging the engaging member from the opening of the storage body.

With this configuration, the storage body is reoriented by engaging the engaging member of the reorienting device from the opening of the storage body.

According to a conveyor system of the present invention, in the conveyor system, the reorienting device includes an article support member that drops the article from the opening of the storage body while supporting the article, and the article support member drops the article into the storage body and internally presses the storage body so as to reorient the storage body.

With this configuration, the storage body is reoriented by pressing the interior of the storage body by means of the article support member for dropping the article from the opening of the storage body. If the storage body includes the loop-shaped bag composed of the belt-like member (fabric band), the storage body is reoriented by externally pressing the inner surface of the loop-shaped belt-like member.

According to a conveyor system of the present invention, in the conveyor system, the storage body has a first surface suspended from the suspending member and a second surface suspended from the suspending member so as to be opposed to the first surface, the first and second surfaces being formed on an integrated member, the opening is formed on the first surface, the second surface is internally pressed by the engaging member so as to move the opening to a position where the article is allowed to be dropped into the storage body, and the second surface is further internally pressed by the engaging member so as to move the opening to a position where the article stored in the storage body is allowed to be discharged.

With this configuration, the second surface is internally pressed by the engaging member so as to move the opening to the position where the article is allowed to be dropped, and the second surface is further internally pressed by the engaging member so as to move the opening to the position where the article is allowed to be discharged.

According to a conveyor system of the present invention, in the conveyor system, the storage body has a first surface suspended from the suspending member and a second surface suspended from the suspending member so as to be opposed to the first surface, the first and second surfaces being formed on an integrated member, the opening is formed on the first surface, the first surface is internally pressed by the engaging member so as to move the opening to a position where the article is allowed to be dropped into the storage body, and the second surface is internally pressed by the engaging member so as to move the opening to a position where the article stored in the storage body is allowed to be discharged.

With this configuration, the first surface is internally pressed by the engaging member so as to move the opening to the position where the article is allowed to be dropped, and the second surface is internally pressed by the engaging member so as to move the opening to the position where the article is allowed to be discharged.

According to the conveyor system of the present invention, the reorienting device reorients the storage body by engaging the engaging member with the interior of the storage body of the suspended storage, thereby simplifying the configuration of the storage body. Thus, in the conveyor system for conveying articles stored in the suspended storages, the suspended storage can have the storage body with a simple configuration.

DETAILED DESCRIPTION OF THE INVENTION

A conveyor system 80 according to the present invention will be described below. The present invention is not limited to the conveyor system 80 which will be described below.

Figure 1:
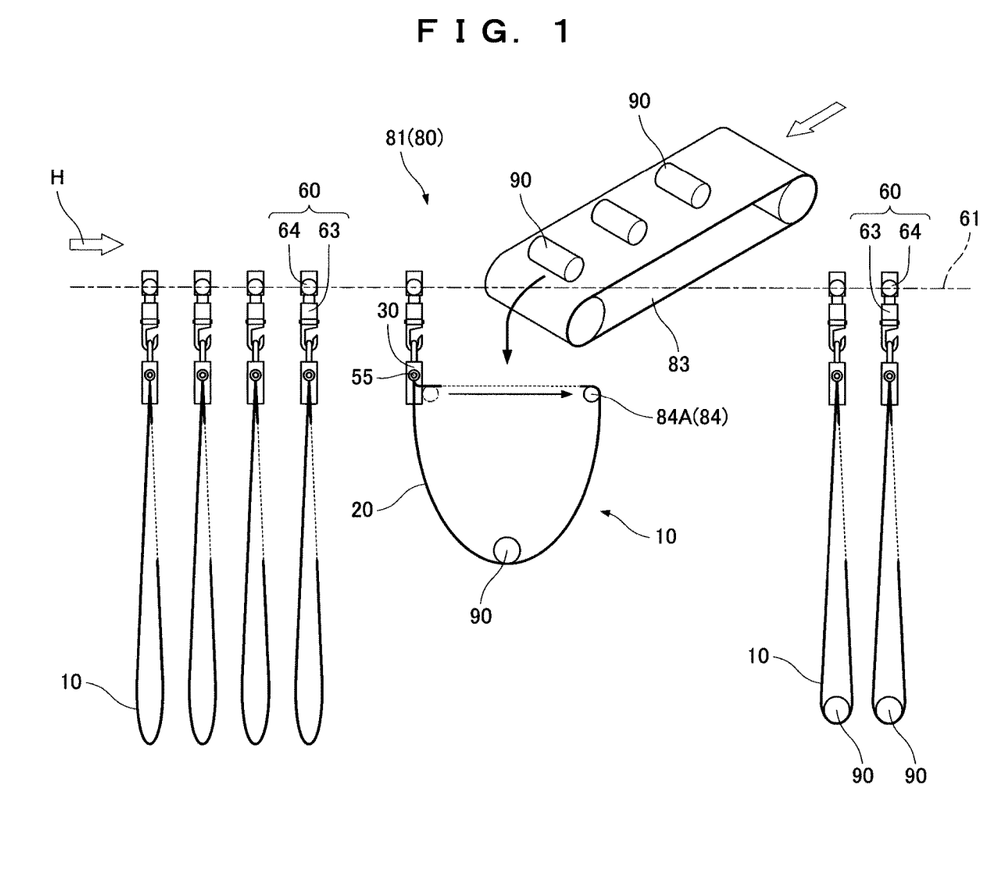
FIG. 1 is a schematic side view showing a drop area for a conveyor system according to the present invention.
Figure 2:
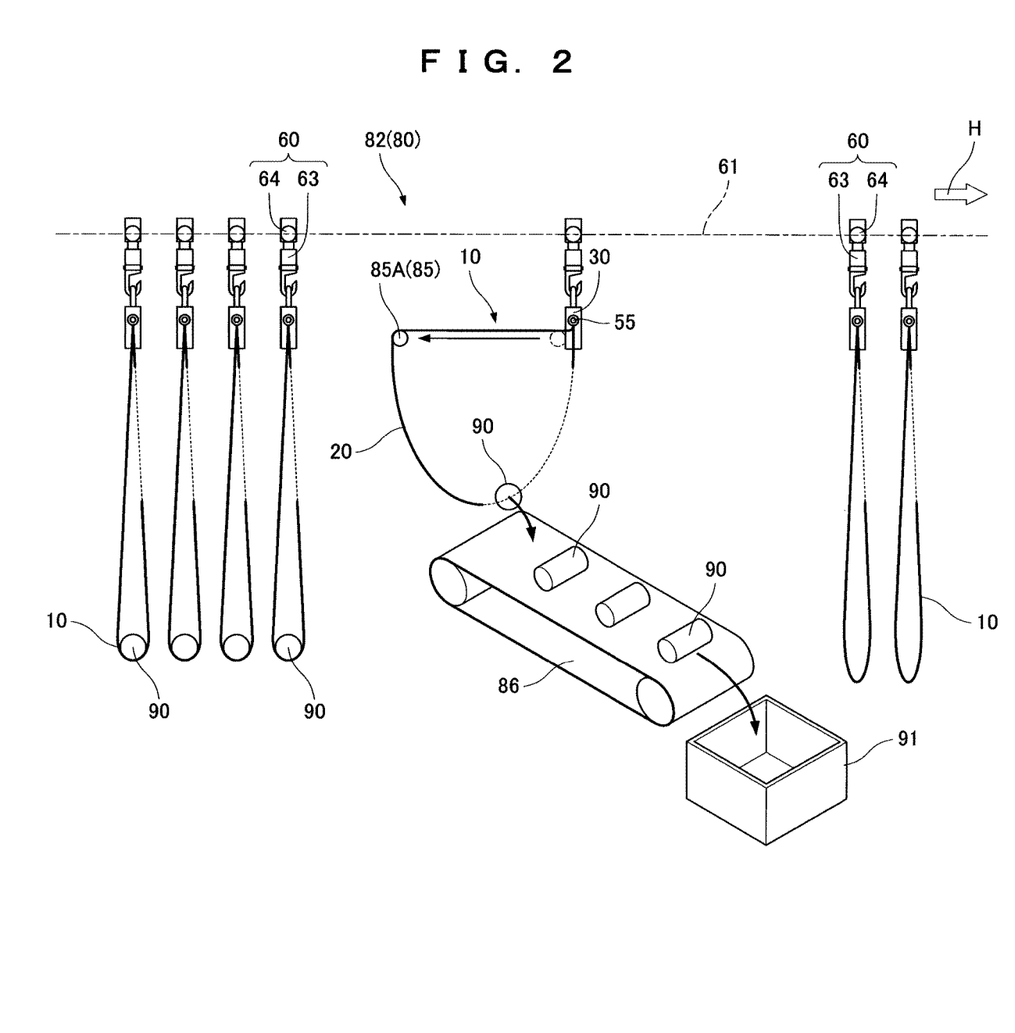
FIG. 2 is a schematic side view showing a discharge area for the conveyor system according to the present invention.

As shown in FIGS. 1 and 2, the conveyor system 80 is a system where articles 90 ordered (requested) by registered individual users (customers) are collectively delivered to a user-allocated collection container 91.

In the conveyor system 80, the article 90 ordered by a user is dropped and stored into a bag 10 (an example of "suspended storage"), which will be discussed later, and then the bag 10 containing the article 90 is conveyed to the collection container 91 by a hanger sorter 60, so that the article 90 in the bag 10 is collected into the collection container 91.

Figure 3A:
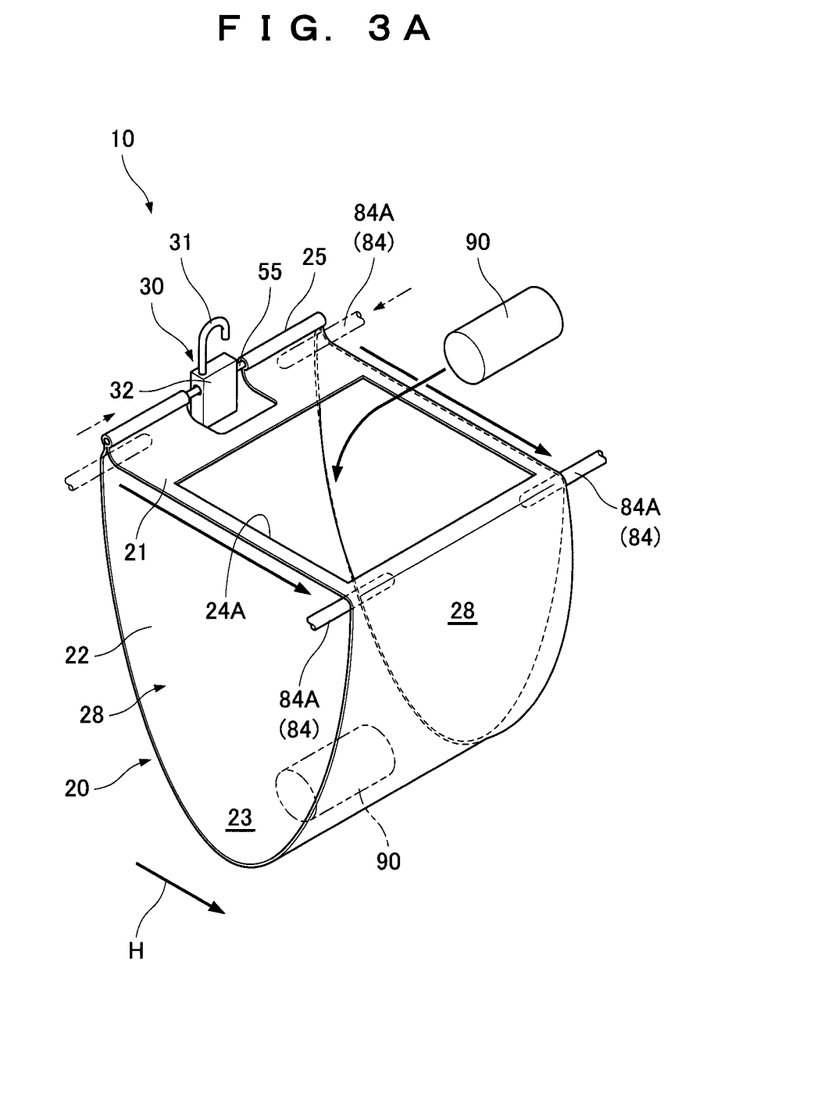
FIG. 3A is a perspective view showing an article being dropped into a suspended storage used in the conveyor system according to the present invention.
Figure 3B:
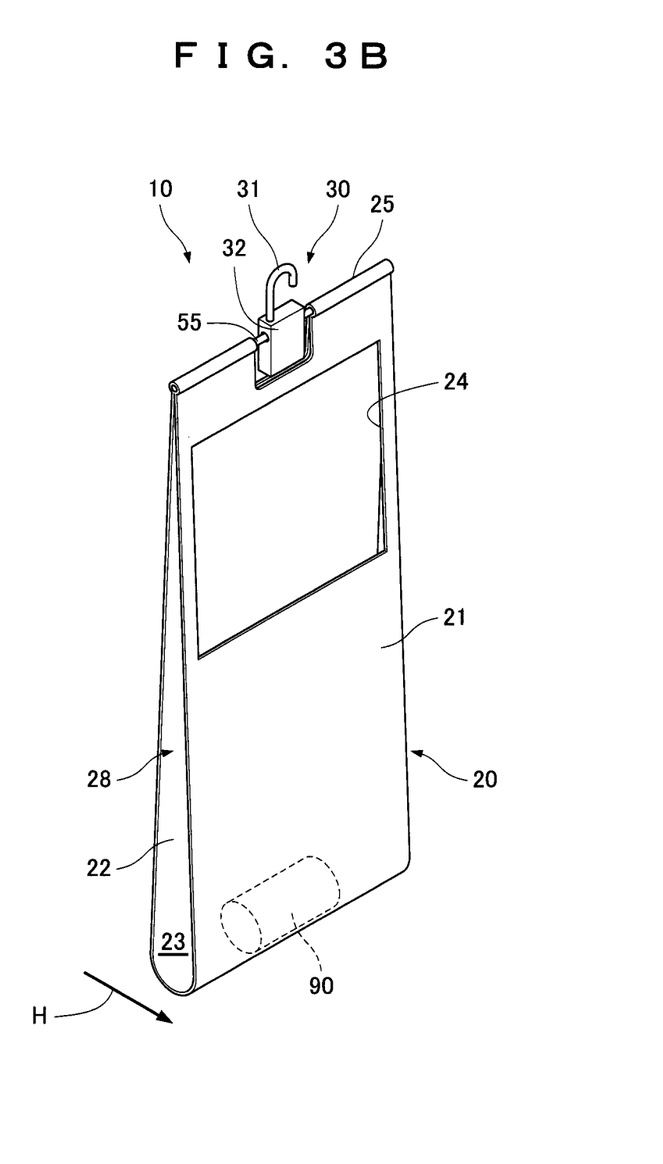
FIG. 3B is a perspective view showing the conveyance of the suspended storage used in the conveyor system according to the present invention.
Figure 3C:
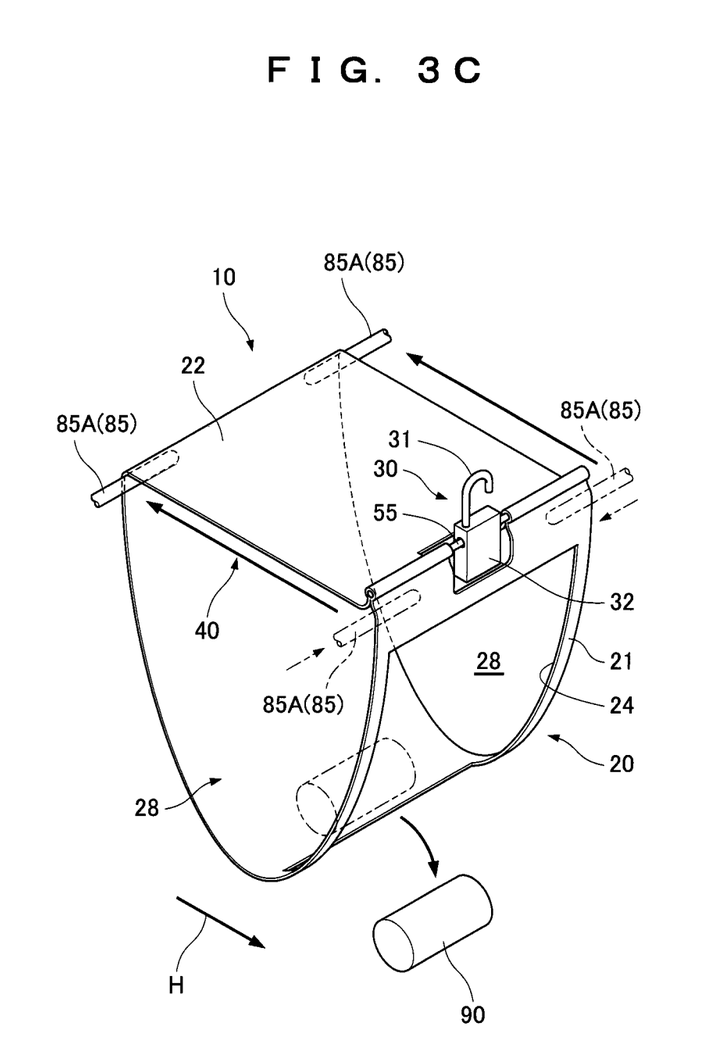
FIG. 3C is a perspective view showing the article being discharged from the suspended storage used in the conveyor system according to the present invention.

As shown in FIGS. 3A to 3C, the bag 10 used in the conveyor system 80 includes a body 20 (an example of "storage body") that stores the article 90, a suspending member 30 that suspends the bag 10 from a rail 61 (the support 63 of the hanger sorter 60), and a support member 55 for supporting the suspended body 20.

The body 20 is composed of a fabric band. The body 20 is formed into a bag (bag-shaped) by connecting both ends of the fabric band into a loop shape in the longitudinal direction. The body 20 includes a front surface 21 (an example of "first surface") that is formed so as to be suspended from the support member 55 and a rear surface 22 (an example of "second surface") that is formed so as to be suspended from the support member 55 so as to be opposed to the front surface 21. The body 20 is supported by the support member 55 while being suspended substantially like a letter O in side view. The body 20 has an engaged part 25 that is engaged with the support member 55 on a part of the loop-shaped bag. The body 20 has a storage part 23 (an example of "article storage space") that is an internal space (a space between the front surface 21 and the rear surface 22) of a bag suspended from the support member 55. The article 90 is stored in the suspended lower part of the bag. The body 20 has an opening 24 for dropping and discharging the article 90 into and from the body 20, in the upper part of the front surface 21.

The suspending member 30 includes a hook 31 engaged with the support 63 of the hanger sorter 60 and a block 32 that supports the support member 55 while being fixed to the hook 31. The hook 31 can be suspended from the support 63. The hook 31 is engaged with the support 63, suspending the bag 10 from the hanger sorter 60. The support member 55 is fixed to both ends of the block 32.

The support member 55 includes a rod-shaped member extended from both sides of the block 32 of the suspending member 30. The support member 55 is engaged with the engaged part 25 of the body 20 so as to support the body 20.

As shown in FIGS. 1 and 2, the conveyor system 80 includes a drop area 81 for dropping the article 90 into the bag 10, a discharge area 82 for discharging the article 90 from the bag 10, hanger sorters 60 that convey the suspended bags 10 with the stored articles 90 between the areas of the conveyor system 80, and a rail 61 that is provided on the ceiling above the floor between the areas of the conveyor system 80.

As shown in FIGS. 1 and 3A to 3C, the drop area 81 includes a first conveyor 83 for conveying, to the bags 10, the articles 90 to be stored in the bags 10, and a first reorienting device 84 for reorienting the bags 10.

The first conveyor 83 is a known conveyor capable of conveying the articles 90 at regular intervals. The first conveyor 83 conveys the articles 90 to a position for dropping the articles 90 into the bags 10. When the articles 90 are conveyed to the dropping position, the first conveyor 83 automatically drops the articles 90 into the bags 10.

The first reorienting device 84 is a device for reorienting the bag 10 (body 20) from an orientation for conveying the article 90 to an orientation for dropping the article 90 into the opening 24 of the bag 10. The first reorienting device 84 is mainly composed of a pair of first engaging members 84A that are engaged with the body 20 and a drive unit (not shown) that drives the first engaging members 84A.

The first engaging members 84A are rod-shaped members insertable from a loop-shaped opening 28 formed on both sides of the body 20 (both ends in the width direction of the fabric band constituting the body 20) that is a loop-shaped bag. The first engaging members 84A are disposed on both ends of the conveying path of the bag 10 to be conveyed by the hanger sorter 60. When the bag 10 is conveyed to the position for dropping the article 90, the first engaging members 84A move into the body 20 in a direction horizontally crossing a conveying direction H of the bag 10. The first engaging members 84A engage into the body 20 from the opening 28 of the body 20 and are horizontally moved in the body 20 by the driving of the drive unit, which is not shown, thereby reorienting the body 20.

As shown in FIG. 2, the discharge area 82 includes a second reorienting device 85 for reorienting the bags 10, and a conveyor 86 for receiving the articles 90 discharged from the bags 10.

The second reorienting device 85 is a device for reorienting the bag 10 (body 20) from the orientation for conveying the article 90 to an orientation for dropping the article 90 from the opening 24 of the bag 10. The second reorienting device 85 is mainly composed of, like the first reorienting device 84, a pair of second engaging members 85A that are engaged with the body 20 and a drive unit (not shown) that drives the second engaging members 85A.

The conveyor 86 is a known conveyor capable of conveying the articles 90, which are discharged from the bags 10, at regular intervals. The conveyor 86 is disposed below a discharge position for discharging the articles 90 from the bags 10. The conveyor 86 conveys the articles 90, which are received from the bags 10, to the collection container 91 disposed downstream of the conveyor 86.

The hanger sorter 60 is a hanging device that conveys the suspended bags 10. The hanger sorter 60 includes a support 63 that supports the suspended bag 10 and a carrier 64 that is engaged with the rail 61 so as to move the support 63.

The orientations of the bag 10 will be discussed below, during the conveyance of the article 90 in the bag 10, the dropping of the article 90 into the bag 10, and the discharge of the article 90 from the bag 10. In the following explanation, the conveying direction H of the bag 10 will be described as the longitudinal direction of the bag 10, whereas a horizontal direction crossing the conveying direction H of the bag 10 will be described as the lateral direction of the bag 10.

When the article 90 is dropped into the bag 10 (body 20), the first engaging members 84A of the first reorienting device 84 are inserted from the opening 28 on both sides of the body 20 as shown in FIG. 3A, for the bag 10 suspended from the suspending member 30 (block 32) shown in FIG. 3B, and the inserted first engaging members 84A are horizontally moved in the same direction (from the rear to the front of the bag 10) as the conveying direction H of the bag 10 in the body 20, so that the orientation of the body 20 is reoriented from the orientation for conveying the article 90 to the orientation for dropping the article 90 into the opening 24 of the bag 10. Specifically, as shown in FIGS. 1 and 3A to 3C, the bag 10 is conveyed to the dropping position of the article 90, and then the pair of first engaging members 84A of the first reorienting device 84 is inserted from the opening 28 on both ends of the body 20 into an upper part in the body 20 of the conveyed bag 10 (near the engaged part 25 of the body 20). Furthermore, the inserted first engaging members 84A are horizontally moved forward while being engaged with the body 20. Thus, the interior of the front surface 21 of the body 20 suspended from the block 32 is pressed and lifted by the first engaging members 84A. Moreover, the horizontal movement of the first engaging members 84A moves the opening 24 of the front surface 21 of the body 20 to a position where the opening is directed upward in the horizontal direction (a position where the article 90 can be dropped into the body 20) and longitudinally extends a space between the front surface 21 and the rear surface 22 of the body 20. Thus, the bag 10 is oriented to receive the article 90 to be dropped into the opening 24 of the bag 10.

When the article 90 is stored and conveyed in the bag 10 (body 20), from a state where the first engaging members 84A of the first reorienting device 84 are engaged with the body 20 as shown in FIG. 3A, the first engaging members 84A are disengaged from the body 20 as shown in FIG. 3B, so that the orientation of the body 20 is reoriented from the orientation for dropping the article 90 into the opening 24 of the bag 10 to the orientation for conveying the article 90. Specifically, as shown in FIGS. 1 and 3A to 3C, the first engaging members 84A inserted into the body 20 are removed from the body 20, so that the first engaging members 84A are disengaged from the body 20, the front surface 21 of the body 20 is suspended from the block 32 by the weight of the body 20, and a space is reduced between the front surface 21 and the rear surface 22 of the body 20. Thus, the bag 10 is oriented to convey the article 90.

When the article 90 is discharged from the bag 10 (body 20), the second engaging members 85A of the second reorienting device 85 are inserted from the opening 28 on both sides of the body 20 as shown in FIG. 3C, for the bag 10 suspended from the suspending member 30 (block 32) shown in FIG. 3B, and the inserted second engaging members 85A are horizontally moved in the opposite direction (from the front to the rear of the bag 10) from the conveying direction H of the bag 10 in the body 20, so that the orientation of the body 20 is reoriented from the orientation for conveying the article 90 to the orientation for discharging the article 90 from the opening 24 of the bag 10. Specifically, as shown in FIGS. 2 and 3A to 3C, the bag 10 is conveyed to the discharge position of the article 90, and then the pair of second engaging members 85A of the second reorienting device 85 is inserted from the opening 28 on both ends of the body 20 into an upper part in the body 20 of the conveyed bag 10 (near the engaged part 25 of the body 20).

Furthermore, the inserted second engaging members 85A are horizontally moved rearward while being engaged with the body 20. Thus, the interior of the rear surface 22 of the body 20 suspended from the block 32 is pressed and lifted by the second engaging members 85A. Moreover, the horizontal movement of the second engaging members 85A moves the opening 24 of the front surface 21 of the body 20 to a position where the opening is directed downward (a position where the article 90 can be discharged from the body 20) and longitudinally extends a space between the front surface 21 and the rear surface 22 of the body 20. Hence, the bag 10 is oriented to discharge the article 90 from the opening 24 of the bag 10, so that the article 90 stored in the storage part 23 of the bag 10 is discharged from the opening 24.

As described above, according to the present embodiment, the first and second reorienting devices 84 and 85 allow the engagement of the first and second engaging members 84A and 85A with the interior of the body 20 of the bag 10 so as to reorient the body 20, achieving the body 20 with a simple configuration. Thus, in the conveyor system for conveying articles stored in the suspended storages, the bag 10 is usable with the body 20 having a simple configuration.

Figure 4A:
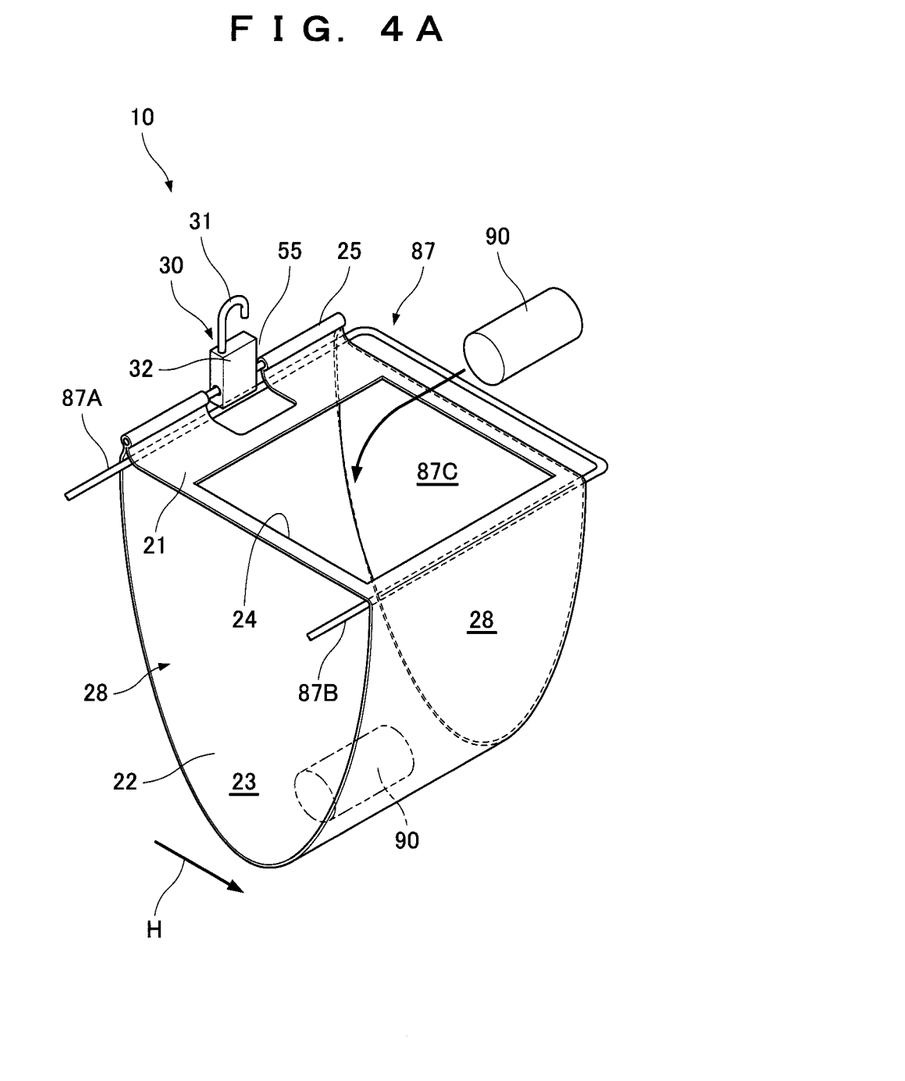
FIG. 4A is a perspective view showing the article being dropped into the suspended storage including a frame-like engaging member in the conveyor system according to the present invention.
Figure 4B:
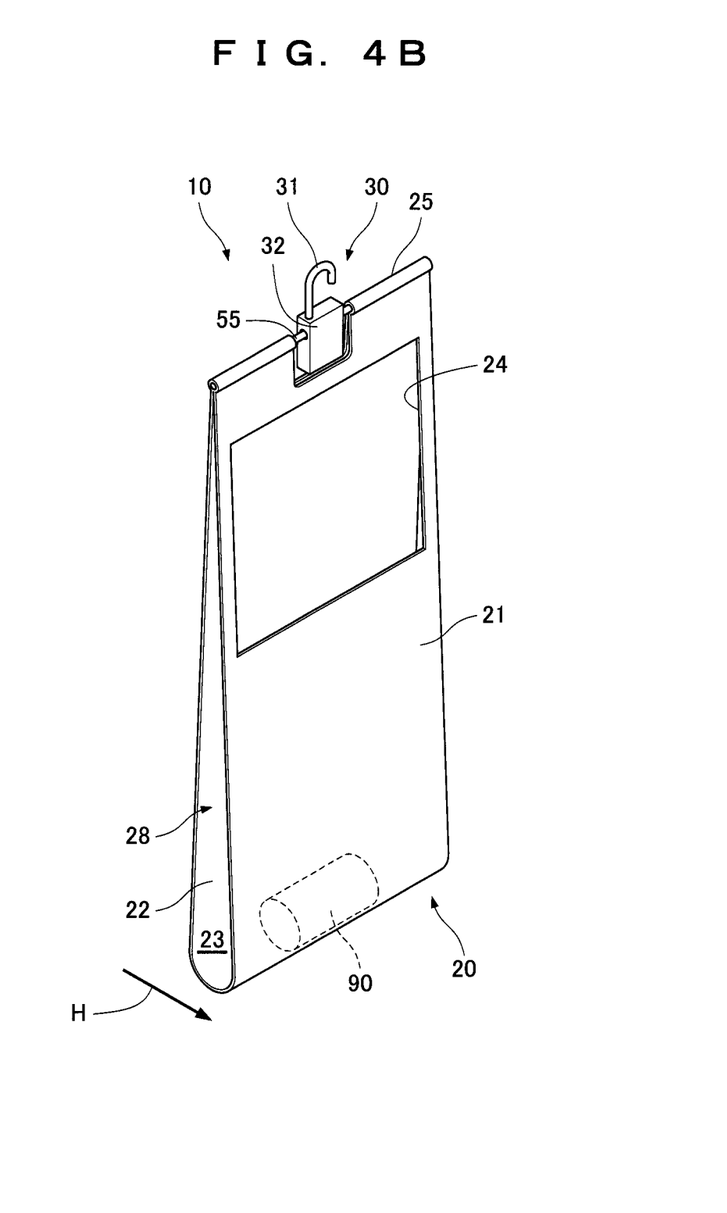
FIG. 4B is a perspective view showing the conveyance of the suspended storage including the frame-like engaging member in the conveyor system according to the present invention.
Figure 4C:
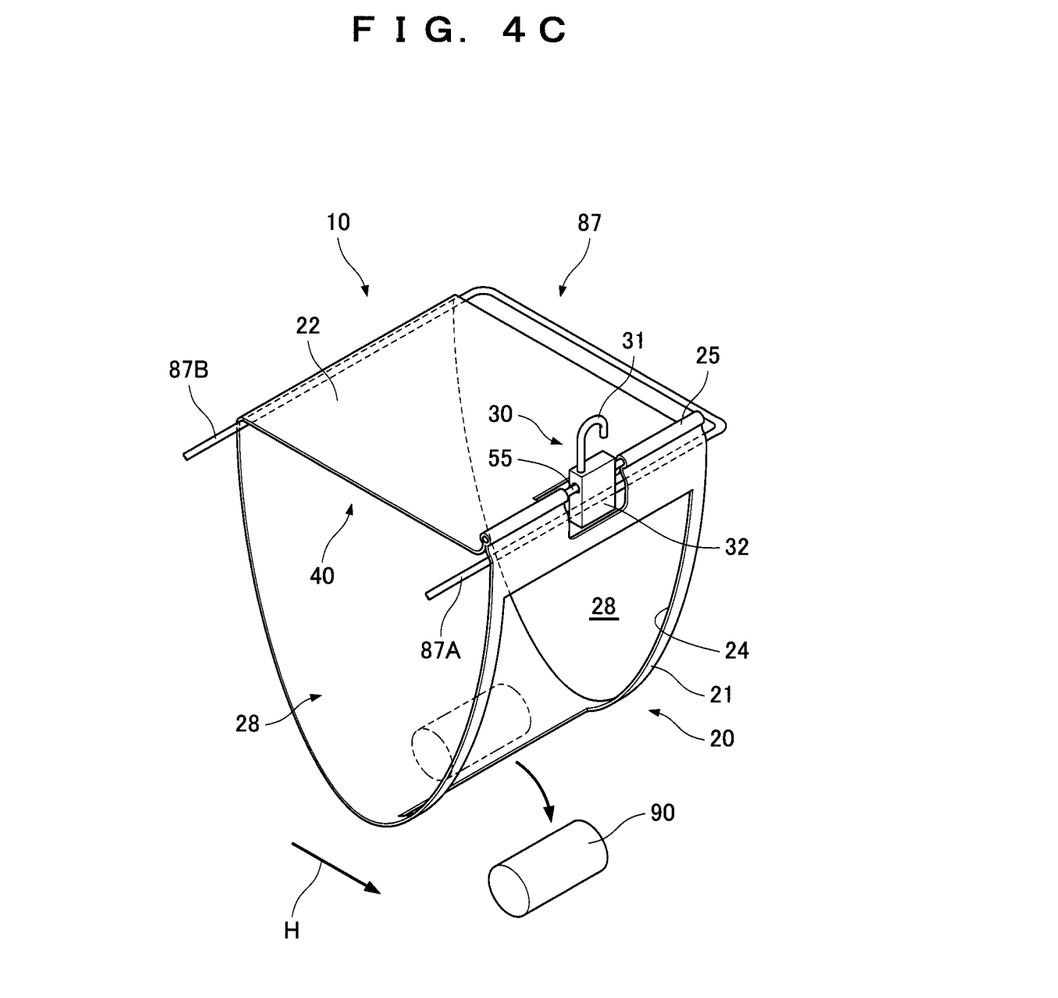
FIG. 4C is a perspective view showing the article being discharged from the suspended storage including the frame-like engaging member in the conveyor system according to the present invention.

In the present embodiment, the first and second engaging members 84A and 85A of the first and second reorienting devices 84 and 85 include rod-shaped members but are not limited thereto. As shown in FIGS. 4A to 4C, the reorienting device may include an engaging member 87 composed of a frame member. The engaging member 87 includes a rectangular loop-shaped frame having no faces. The engaging member 87 is configured such that a lower frame member 87B pivots about an upper frame member 87A in the conveying direction H of the bag 10 (the longitudinal direction of the bag 10). The engaging member 87 has an input opening 87C for the article 90, a part surrounded by the loop-shaped frame member. The engaging member 87 is configured such that the width of the input opening 87C (the width of the upper frame member 87A and the lower frame member 87B) is larger than the opening width of the opening 24 of the body 20.

As shown in FIG. 4A, when the article 90 is dropped into the bag 10 (body 20) with the engaging member 87, the engaging member 87, which is vertically raised, is inserted from the opening 28 on one side of the body 20 in the bag 10 suspended from the suspending member 30 (block 32), and the lower frame member 87B in the body 20 is pivoted forward about the upper frame member 87A of the inserted engaging member 87, so that the engaging member 87 is placed in a horizontal position. Thus, the inside of the front surface 21 of the body 20 is lifted and moved to a position where the opening 24 of the body 20 is placed face up in a horizontal position (a position where the article 90 can be dropped into the body 20). In other words, the body 20 is reoriented from the orientation for conveying the article 90 to the orientation for dropping the article 90 into the opening 24.

As shown in FIG. 4C, when the article 90 is discharged from the bag 10 (body 20) with the engaging member 87, the engaging member 87, which is vertically raised, is inserted from the opening 28 on one side of the body 20 in the bag 10 suspended from the suspending member 30 (block 32), and the lower frame member 87B in the body 20 is pivoted rearward about the upper frame member 87A of the inserted engaging member 87, so that the engaging member 87 is placed in a horizontal position. Thus, the inside of the rear surface 22 of the body 20 is lifted and moved to a position where the opening 24 of the body 20 is placed face down (a position where the article 90 can be discharged from the body 20). In other words, the body 20 is reoriented from the orientation for conveying the article 90 to the orientation for discharging the article 90 from the opening 24.

In the foregoing embodiment, the engaging member 87 is inserted from the opening 28 on one side of the body 20. The present invention is not limited to this configuration. A pair of engaging members 87 may be inserted from the opening 28 on both sides of the body 20 so as to hold the body 20 between the engaging members 87.

Figure 5A:
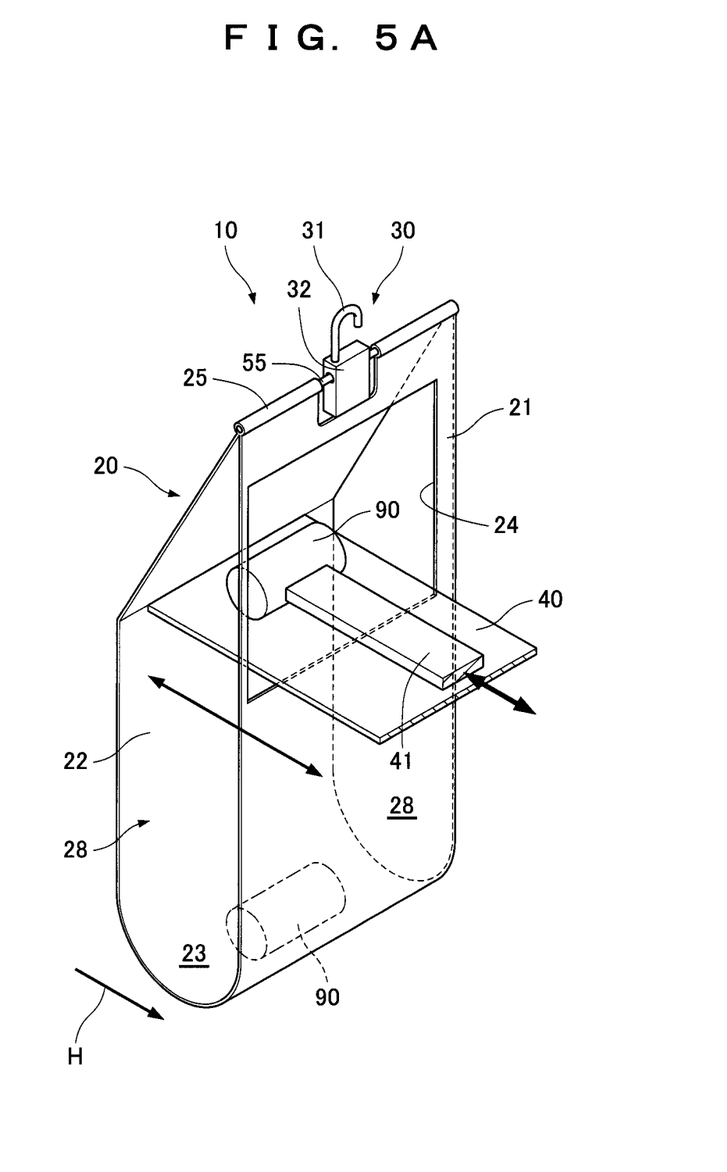
FIG. 5A is a perspective view showing the article being dropped into the suspended storage including an article support member in the conveyor system according to the present invention.
Figure 5B:
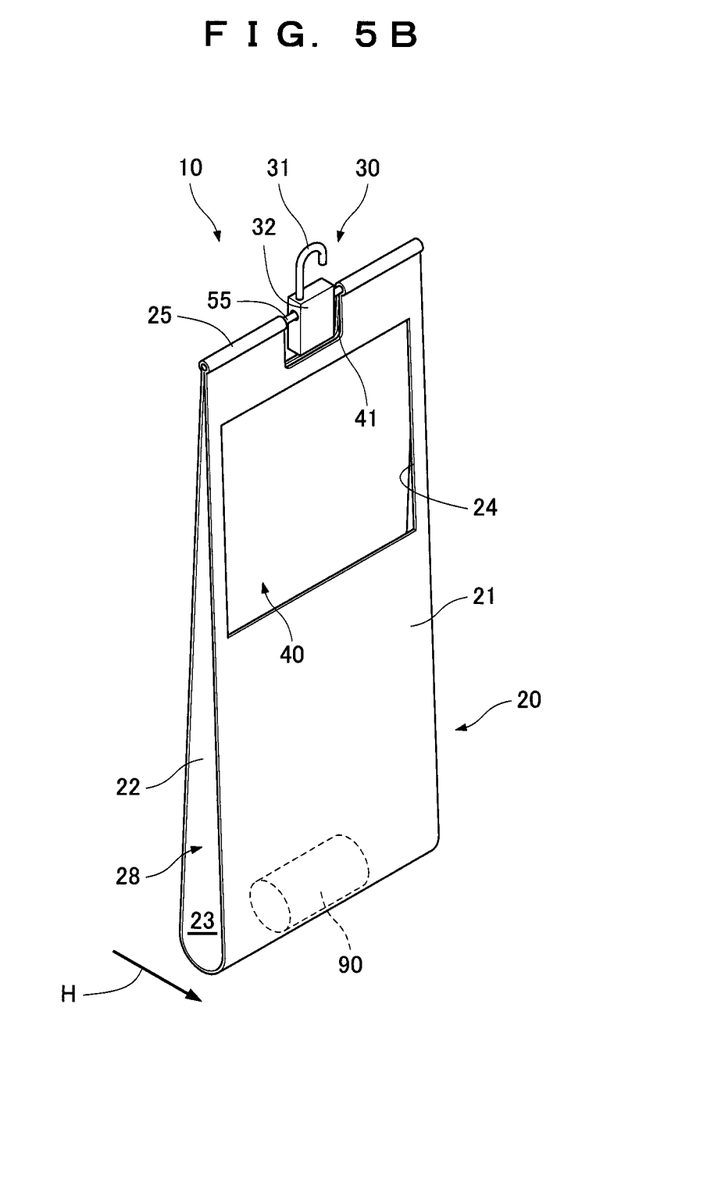
FIG. 5B is a perspective view showing the conveyance of the suspended storage including the article support member in the conveyor system according to the present invention.
Figure 5C:
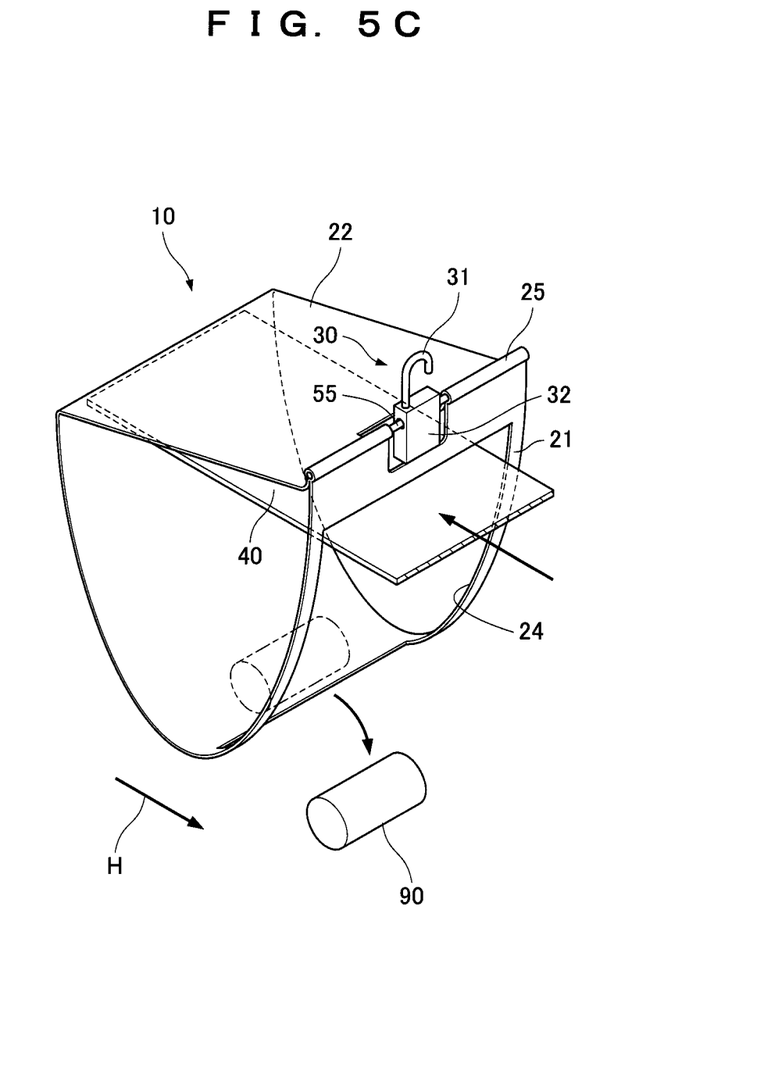
FIG. 5C is a perspective view showing the article being discharged from the suspended storage including the article support member in the conveyor system according to the present invention.

In the present embodiment, the body 20 is reoriented by the first and second engaging members 84A and 85A of the first and second reorienting devices 84 and 85. The present invention is not limited to this configuration. As shown in FIGS. 5A to 5C, the body 20 may be reoriented by an article support member 40 for dropping the article 90 from the opening 24 of the body 20 while supporting the article 90.

The article support member 40 includes a long plate member where the article 90 can be placed. The article support member 40 can be inserted into the opening 24 from the front surface 21 of the body 20. On the article support member 40, a press member 41 is provided to press the article 90, which is placed on the article support member 40, along the longitudinal direction of the article support member 40.

As shown in FIG. 5A, when the article 90 is dropped into the bag 10 (body 20) with the article support member 40, the article support member 40 is inserted into the opening 24 from the front surface 21 of the body 20. At this point, the article support member 40 is inserted into the body 20 while being in contact with the lower edge of the opening 24 of the body 20. The rear surface 22 of the body 20 is pressed by one end of the article support member 40, allowing the article 90 to be dropped from the opening 24 into the body 20 and longitudinally extending a space between the front surface 21 and the rear surface 22 of the body 20. Moreover, the article 90 placed on the article support member 40 is pressed by the press member 41 into the body 20, so that the article 90 is dropped into the body 20.

As shown in FIG. 5C, when the article 90 is discharged from the bag 10 (body 20) with the article support member 40, the article support member 40 is inserted into the opening 24 from the front surface 21 of the body 20. At this point, the article support member 40 is inserted into the body 20 while being in contact with the upper edge of the opening 24 of the body 20. Unlike in the dropping of the article 90 into the body 20, the article support member 40 is inserted to the back side (the rear surface 22) of the body 20 (the insertion distance of the article support member 40 to be inserted into the body 20 is increased) and the rear surface 22 of the body 20 is pressed by one end of the article support member 40. Thus, the opening 24 of the body 20 is placed facedown and is moved to a position where the article 90 can be discharged in the body 20, and a space is longitudinally extended between the front surface 21 and the rear surface 22 of the body 20.

In the present embodiment, the article 90 conveyed to the dropping position by the first conveyor 83 is automatically dropped into the bag 10. The present invention is not limited to this configuration. The article 90 may be dropped into the bag 10 by, for example, an operator or a robot arm.

In the present embodiment, the article 90 discharged from the bag 10 is delivered to the collection container 91 through the conveyor 86. The present invention is not limited to this configuration. For example, the article 90 may be directly delivered into a chute or the collection container 91.

What is claimed is:

1. A conveyor system for conveying an article that is stored while being suspended from a rail, the conveyor system comprising:
    a suspended storage having a storage body for storing the article and a suspending member that suspends the storage body from the rail; and
    a reorienting device that reorients the suspended storage, wherein the suspended storage has an opening on the storage body such that the article is dropped into and discharged from the opening,
    the reorienting device includes an engaging member that is engaged with the storage body, and
    the engaging member is engaged with an interior of the storage body so as to reorient the suspended storage from at least one of an orientation for conveying the article to an orientation for dropping the article into the opening or from the orientation for conveying the article to an orientation for discharging the article from the opening.

2. The conveyor system according to claim 1, wherein the storage body includes a loop-shaped bag having an internal storage space for the article, and
    the reorienting device reorients the storage body by engaging the engaging member from an opening laterally formed on the loop-shaped bag.

3. The conveyor system according to claim 1, wherein the reorienting device reorients the storage body by engaging the engaging member from the opening of the storage body.

4. The conveyor system according to claim 1, wherein the reorienting device includes an article support member that drops the article from the opening of the storage body while supporting the article, and
    the article support member drops the article into the storage body and internally presses the storage body so as to reorient the storage body.

5. The conveyor system according to claim 1, wherein the storage body has a first surface suspended from the suspending member and a second surface suspended from the suspending member so as to be opposed to the first surface, the first and second surfaces being formed on an integrated member,
    the opening is formed on the first surface,
    the second surface is internally pressed by the engaging member so as to move the opening to a position where the article is allowed to be dropped into the storage body, and
    the second surface is further internally pressed by the engaging member so as to move the opening to a position where the article stored in the storage body is allowed to be discharged.

6. The conveyor system according to claim 1, wherein the storage body has a first surface suspended from the suspending member and a second surface suspended from the suspending member so as to be opposed to the first surface, the first and second surfaces being formed on an integrated member,
    the opening is formed on the first surface,
    the first surface is internally pressed by the engaging member so as to move the opening to a position where the article is allowed to be dropped into the storage body, and
    the second surface is internally pressed by the engaging member so as to move the opening to a position where the article stored in the storage body is allowed to be discharged.

7. The conveyor system according to claim 2, wherein the reorienting device reorients the storage body by engaging the engaging member from the opening of the storage body.

8. The conveyor system according to claim 2, wherein the reorienting device includes an article support member that drops the article from the opening of the storage body while supporting the article, and
    the article support member drops the article into the storage body and internally presses the storage body so as to reorient the storage body.

9. The conveyor system according to claim 2, wherein the storage body has a first surface suspended from the suspending member and a second surface suspended from the suspending member so as to be opposed to the first surface, the first and second surfaces being formed on an integrated member,
    the opening is formed on the first surface,
    the second surface is internally pressed by the engaging member so as to move the opening to a position where the article is allowed to be dropped into the storage body, and
    the second surface is further internally pressed by the engaging member so as to move the opening to a position where the article stored in the storage body is allowed to be discharged.

10. The conveyor system according to claim 2, wherein the storage body has a first surface suspended from the suspending member and a second surface suspended from the suspending member so as to be opposed to the first surface, the first and second surfaces being formed on an integrated member,
    the opening is formed on the first surface,
    the first surface is internally pressed by the engaging member so as to move the opening to a position where the article is allowed to be dropped into the storage body, and
    the second surface is internally pressed by the engaging member so as to move the opening to a position where the article stored in the storage body is allowed to be discharged.

* * * * *